United States Patent [19]

Ewanek

[11] Patent Number: 5,332,872
[45] Date of Patent: Jul. 26, 1994

[54] NOISE REDUCTION UNIT FOR GAS COMPRESSORS

[76] Inventor: Nestor Ewanek, 227 Oakside Road S.W., Calgary, Alberta, Canada, T2V 4H7

[21] Appl. No.: 113,200

[22] Filed: Aug. 30, 1993

[51] Int. Cl.⁵ .............................................. E04F 17/04
[52] U.S. Cl. .................................. 181/224; 181/225; 181/229; 181/258; 181/268
[58] Field of Search ............... 181/214, 217, 218, 224, 181/225, 229, 230, 232, 258, 268, 270, 281, 282, 283

[56] References Cited

U.S. PATENT DOCUMENTS

| | | | |
|---|---|---|---|
| 3,219,143 | 11/1965 | Bohanon | 181/224 |
| 3,507,356 | 4/1970 | Smith | 181/224 |
| 3,895,686 | 7/1975 | Savkar et al. | 181/224 |
| 4,260,037 | 4/1981 | Eline | 181/225 X |

Primary Examiner—Michael L. Gellner
Assistant Examiner—Khanh Dang
Attorney, Agent, or Firm—Anthony R. Lambert

[57] ABSTRACT

A sound reduction unit for a compressor, in which the compressor has a cooling fan and an air intake, and the sound reduction unit includes a housing forming an enclosure about the air inlet and a plurality of sound absorbing baffles disposed in the housing and blocking any direct passage of air into the air inlet. The baffles provide free flow of air, which may be achieved by staggering the baffles in overlapping angular rows in a generally rectangular housing, but which preferably includes allowing a gap between the noise reduction unit and the cooling fan, with a flange baffle extending from the noise reduction unit beyond the cooling fan.

5 Claims, 7 Drawing Sheets

NOISE REDUCTION UNIT FOR GAS COMPRESSORS

FIELD OF THE INVENTION

This invention relates to cooling fans of gas compressors.

BACKGROUND AND SUMMARY OF THE INVENTION

Gas pipelines require large compressors to force gas through the pipelines. These compressors may have a fan width of 7 to 12 feet, and move between 96,000 cubic feet of air per minute and 198,000 cubic feet of air per minute. These compressors and their cooling fans generate significant noise, such that they may create a nuisance for those nearby. For this reason, attempts have been made to make the compressors as quiet as possible, such as by modifying the shapes of the cooling fan blades. However, there are many compressors in existence that are not quiet and that continue to create a nuisance. While the compressors are usually located in isolated areas, continued expansion of residences and decreasing tolerance for environmental noise have created a conflict between existing compressors and people living near them.

It has therefore become desirable to reduce the noise emitted by compressors, and particularly their cooling fans, and it is therefore an object of the present invention to reduce the noise emitted by large compressors.

Noise reduction in large compressors is not an easy task particularly when it is desired to reduce the noise emitted by the air intake of the cooling fan of a compressor. The reason for this is that conventional silencers (as for example used on motor vehicles) create a considerable pressure drop that is unacceptable across the air intake of the cooling fan. With a large pressure drop, air supply is reduced which may result in over heating of the gas being conveyed in the pipeline or of the compressor itself, especially on a hot day (>90° F.). It is therefore a further object of this invention to provide a noise reduction unit for a cooling fan of a compressor unit that allows relatively free flow of air into the cooling fan of the compressor unit.

Thus in one embodiment of the invention, there is provided a sound reduction unit for a compressor, in which the compressor has a cooling fan and an air intake, and the sound reduction unit includes a housing forming an enclosure about the air inlet and a plurality of sound absorbing baffles disposed in the housing and blocking any direct passage of air into the air inlet. The baffles provide free flow of air, which may be achieved by staggering the baffles in overlapping angular rows in a generally rectangular housing, but which preferably includes allowing a gap between the noise reduction unit and the cooling fan of the compressor, with a flange baffle extending from the noise reduction unit beyond the cooling fan.

BRIEF DESCRIPTION OF THE DRAWINGS

There will now be described preferred embodiments of the invention, with reference to the drawings, by way of illustration, in which like numerals denote like elements and in which.

DETAILED DESCRIPTION OF PREFERRED EMBODIMENTS

Figure 5:
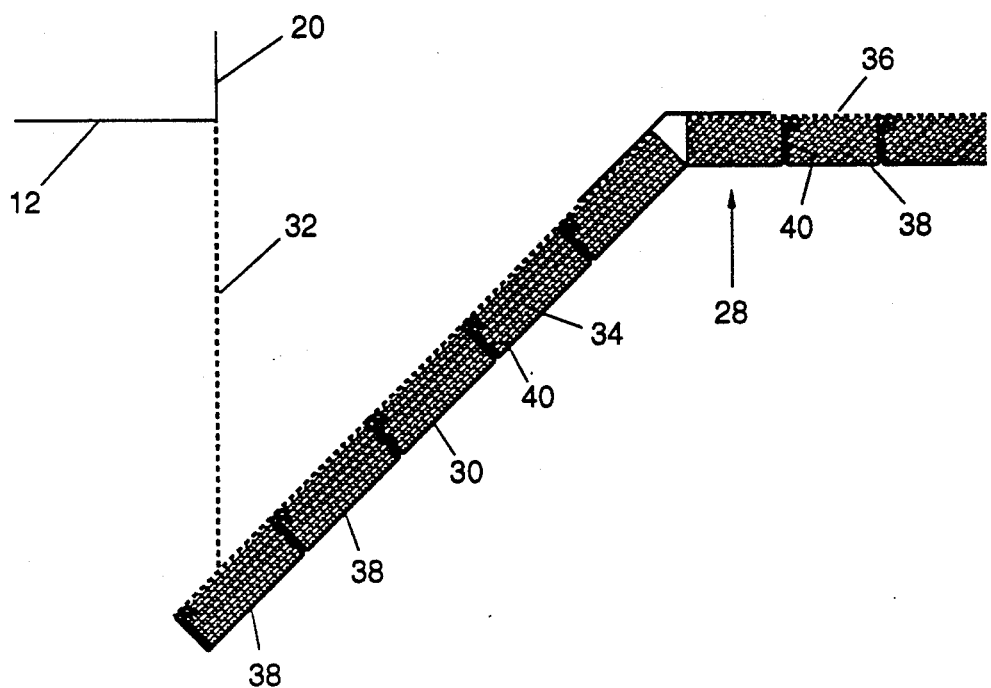
FIG. 5 is a section through the walls of the sound absorbing unit at the cooler side air inlet shown as part of FIG. 2.

Referring to FIGS. 1, 2, 3 and 4, there is shown a sound reduction unit 10 for a cooling fan 12 of a compressor (not shown). The cooling fan 12 is only partially shown, with fan blades 14 and air inlet housing 16 defining an air inlet 18. The cooling fan 12 shown is exemplary and is of conventional construction, with a base 19 that supports the cooling fan 12 and diagonal frame member 21 forming part of the cooling fan. The air inlet housing 16 protrudes in front of a front face 20 of the cooling fan 12. The sound reduction unit 10 is cantilevered onto the base 19 of the cooling fan 12 and fastened onto the base 19 using any of several methods, such as using bolts. The unit 10 includes a sound absorbing housing 22 disposed adjacent and surrounding the air inlet 18. The sound absorbing housing 22 is formed of a top wall 24, bottom wall 26, and side walls 28, together forming an enclosed passageway about the air inlet 18. The walls 28 are each detached from the cooling fan 12 along their length, with a portion of each wall 28 forming a flange baffle 30 extending behind a lateral projection of the front face 20 of the cooling fan 12, as particularly shown in section in FIG. 5. A bug screen 32 is preferably placed across the opening formed between the flange baffle 30 and cooling fan 12, as for example along the lateral projection of the front face 20 of the cooling fan 12 as shown in FIG. 5. The bottom wall 26 is preferably strengthened by and supported on several I-beams (not shown) that run parallel to the walls 28 and are cantilevered onto the base 19, rather than having the bottom wall 26 directly cantilevered onto the base 19. While a cantilever attachment is preferred, the unit may be supported by other methods, and for example vertical posts 58 may be used to support the open front end 56 on the ground in front of the cooling fan.

Figure 6:
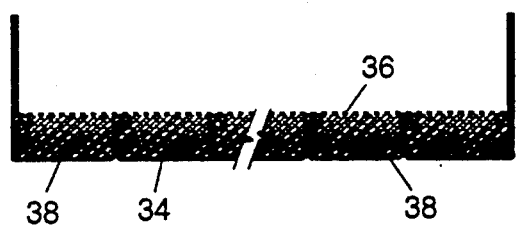
FIG. 6 is a section through the bottom wall of the housing.
Figure 7:
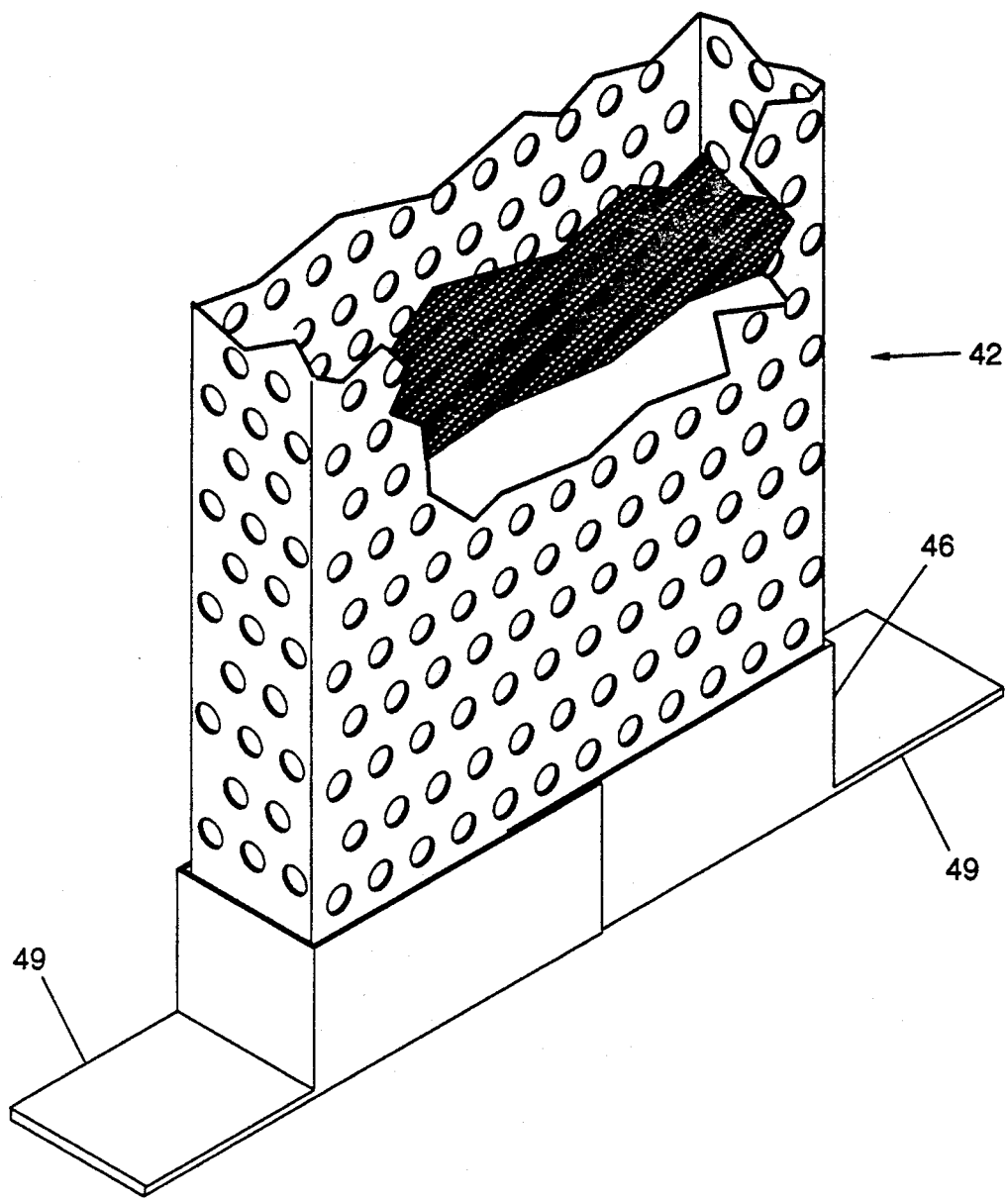
FIG. 7 is an isometric view, partially broken away, showing the construction of a baffle for use with the sound reduction unit of FIG. 1.
Figure 8:
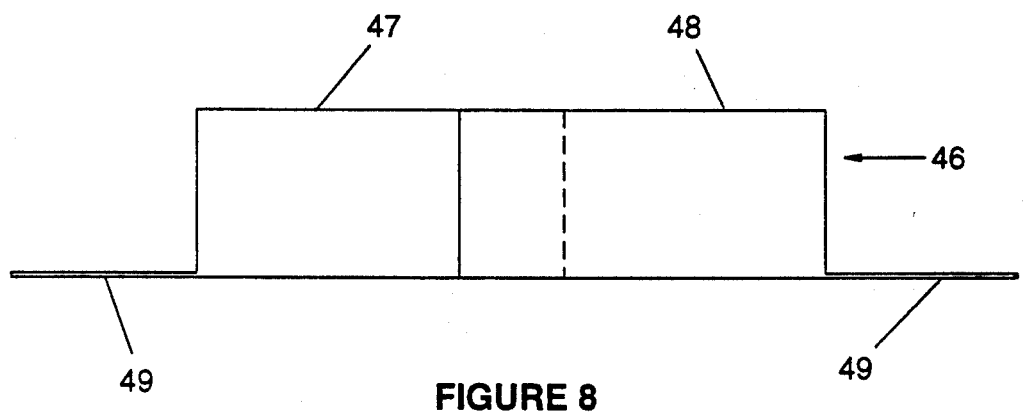
FIG. 8 is a side view of a base plate holder for a baffle of the type shown in FIG. 7.
Figure 9:
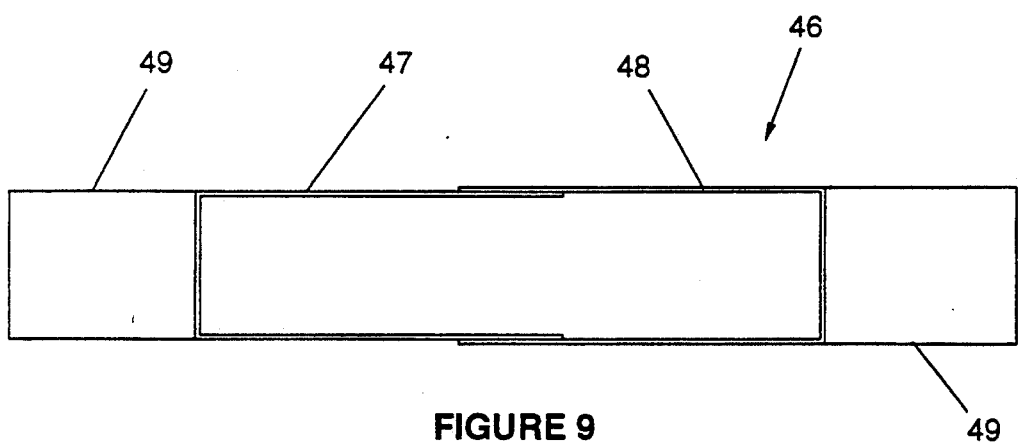
FIG. 9 is a plan view of the base plate shown in FIG. 8.

FIGS. 5 and 6 show the construction of the walls 26 and 28 respectively, which are constructed in a similar manner to the wall 24. In each case, the wall 24, 26 or 28 is made of rigid fibre board acoustic insulation 34 with an interior face covered with expanded metal mesh 36 and an exterior covered with sheet metal forming a plurality of interlocking panels 38. The panels 38 are about 2" thick and hooked together using joiners 40 along one edge of each panel 38, each similarly constructed to engage an opposite edge of an adjacent panel. Any of various well known methods of joining adjacent panels may be used. Each panel 38 forms a sound absorbing baffle.

Figure 1:
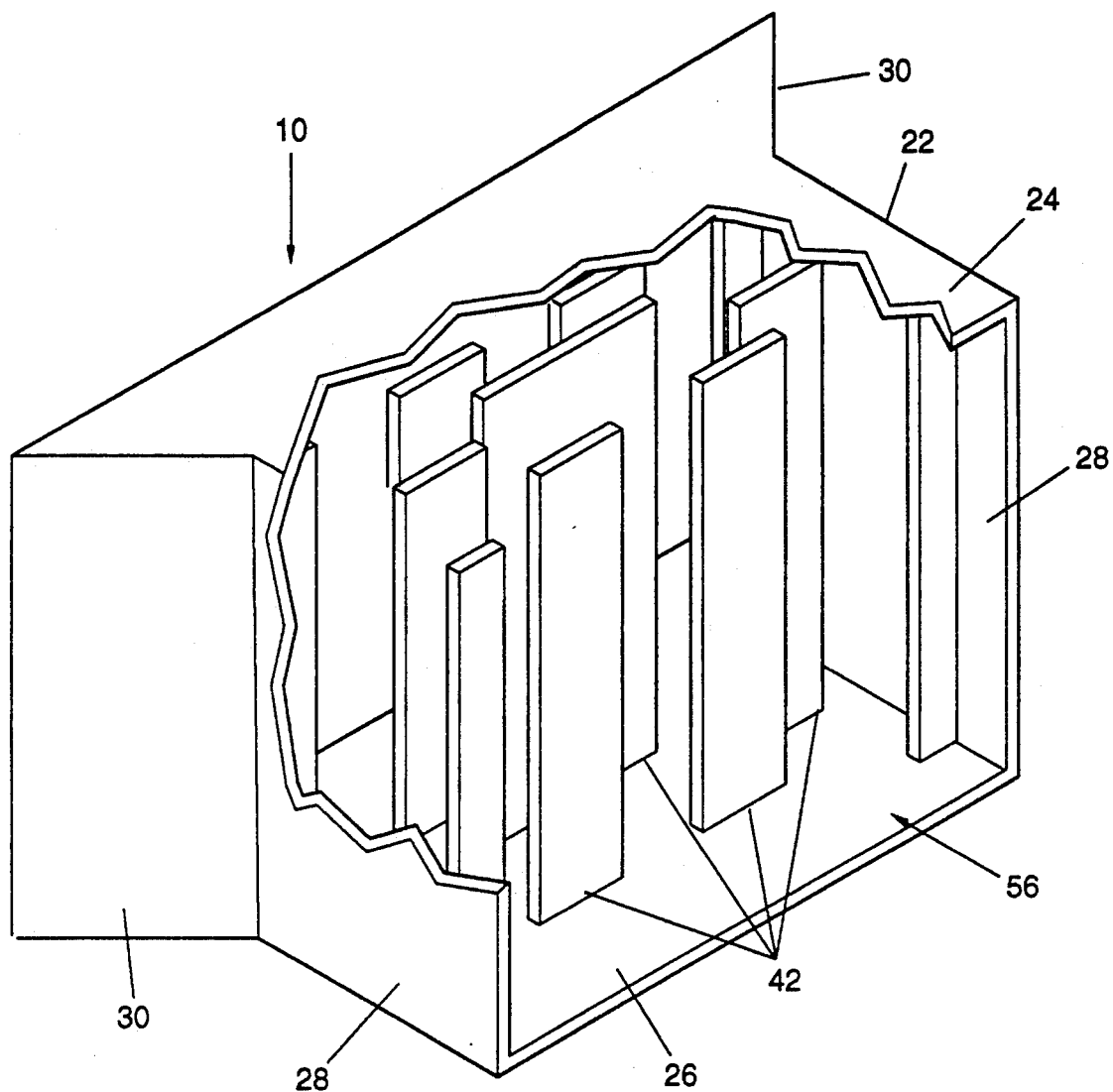
FIG. 1 is an isometric view, partially broken away, of a sound reduction unit according to the invention.
Figure 2:
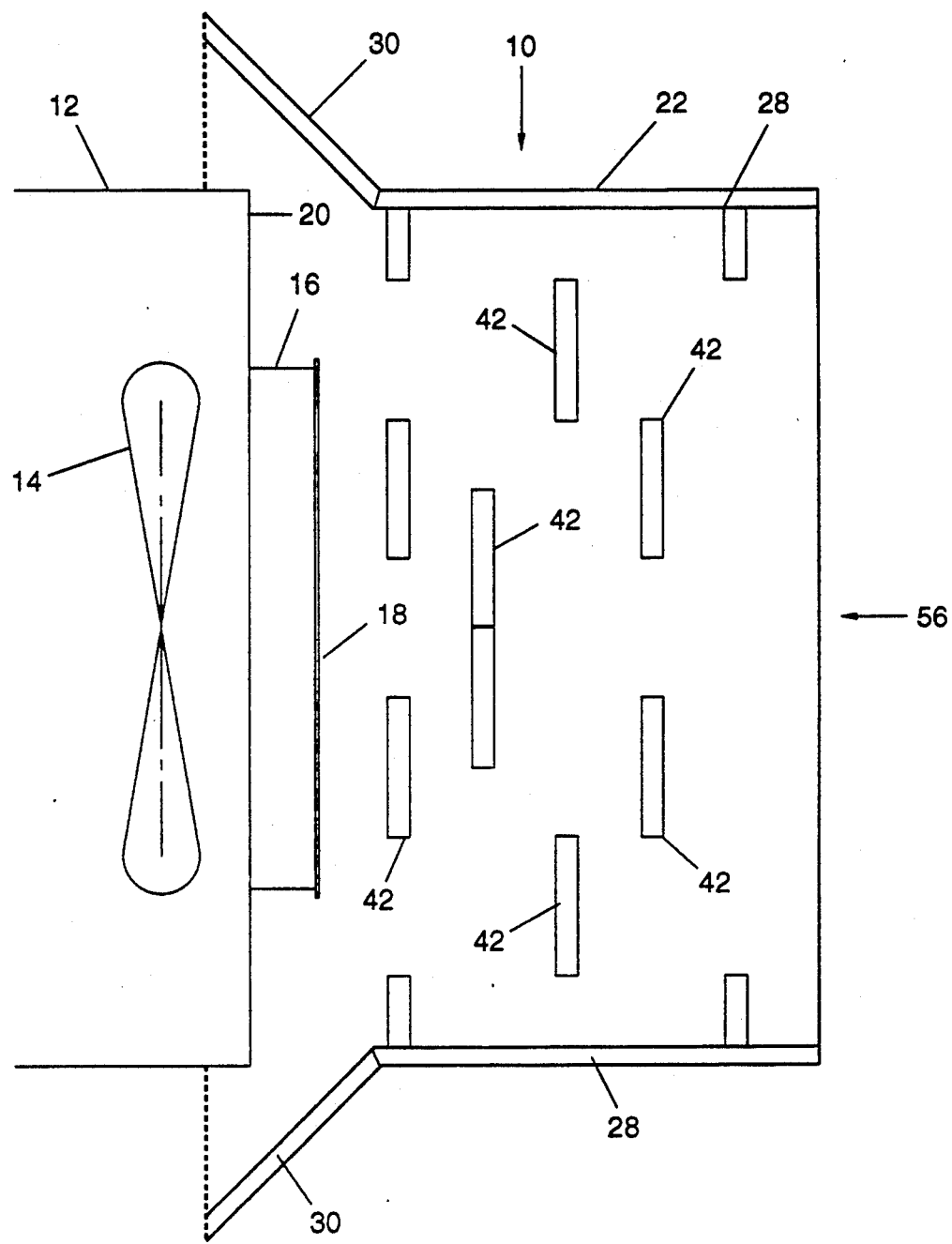
FIG. 2 is a plan view of the sound reduction unit shown in FIG. 1 showing the unit attached to a cooling fan of a compressor with a possible arrangement of baffles.

A plurality of sound absorbing baffles 42, 50, 52 or 54 are attached to the housing 22 to block direct passage of sound from the air inlet while allowing free flow of air into the air inlet. The illustration of the baffles 42 in FIGS. 1 and 2 indicates one manner in which the baffles may be arranged to prevent direct (straight line) passage of sound out from the inlet to the outside of the sound reduction unit. The illustration of the baffles in FIGS. 1 and 2 is intended to show the general principles of the placement of the baffles. Sound moving in a straight line from the air inlet must encounter a baffle. However, baffles that are perpendicular to the mean direction of air movement through the sound reduction unit may cause too great a resistance to the flow of air with consequent overheating of the compressor engine or the gas being compressed and thus it is preferred to place the baffles at an angle to the mean flow of air as illustrated in FIG. 3 (the mean flow direction is indicated by the arrow A).

Each baffle 42, 50, 52 or 54 is constructed in similar manner to the panels 38. Sound absorbing material 44, for example mineral fibre insulation such as Paroc TM 12.80 available from Steel Industrial of Calgary, Alberta, Canada, is encased within expanded metal mesh perforated 40%. The baffles 42, 50, 52 and 54 extend the full height of the housing 22 between the top wall 24 and bottom wall 26. The baffles 42, 50, 52 and 54 are secured within adjustable base plates 46 fastened, for example with screws, to the top wall 24 and bottom wall 26. Each plate 46 is formed of a pair of U-shaped plates 47, 48, one of the plates telescoping within the other, and each U-shaped plate including a flange 49 for fastening the base plates 46 to the top or bottom walls of the housing 22. The baffles are between 12" and 24" in intermediate dimension, with the base plates 46 adjustable to fit these dimensions of baffle.

Figure 3:
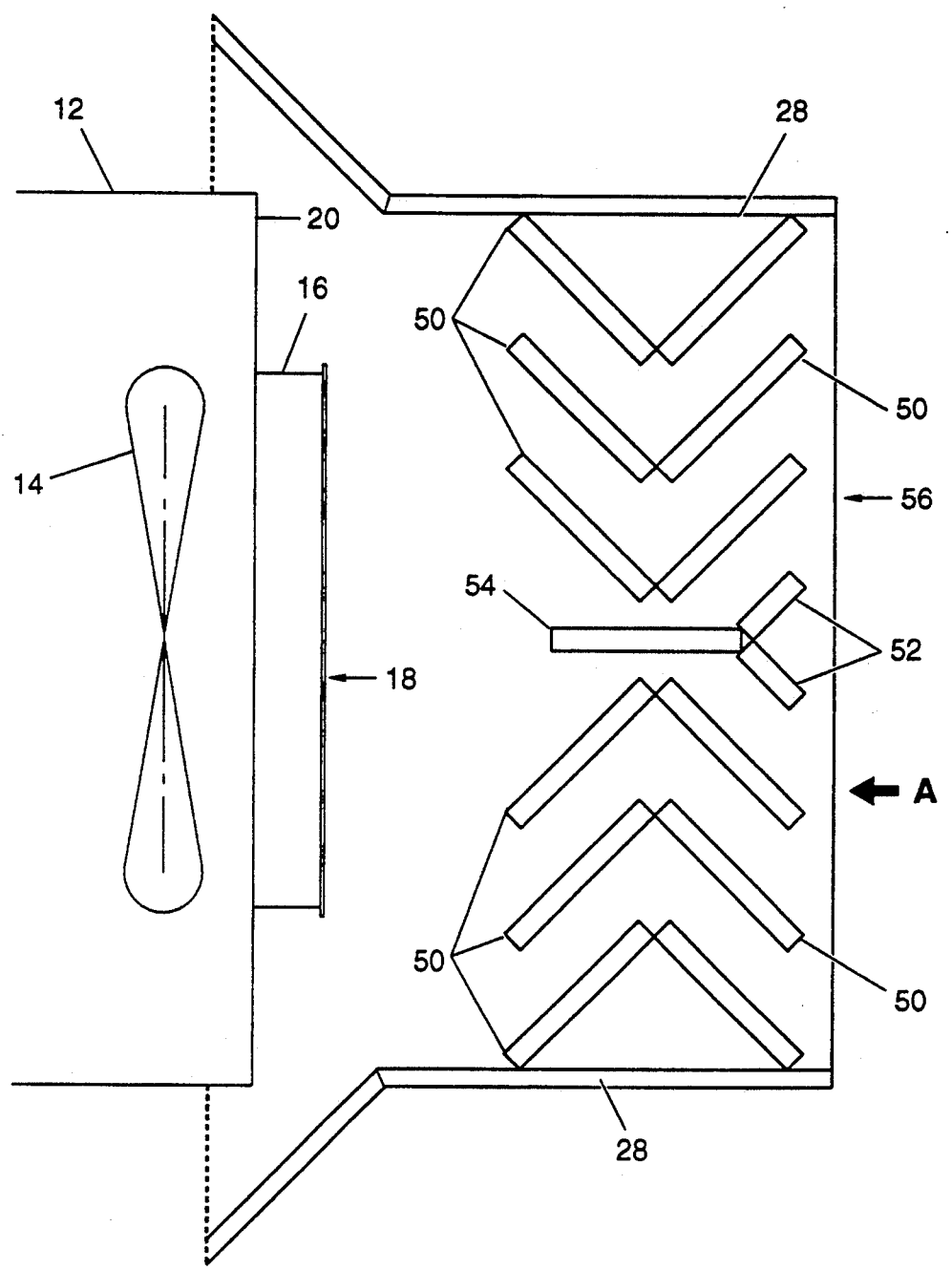
FIG. 3 is a plan view of a sound reduction unit according to the invention showing a preferred arrangement of the baffles.
Figure 4:
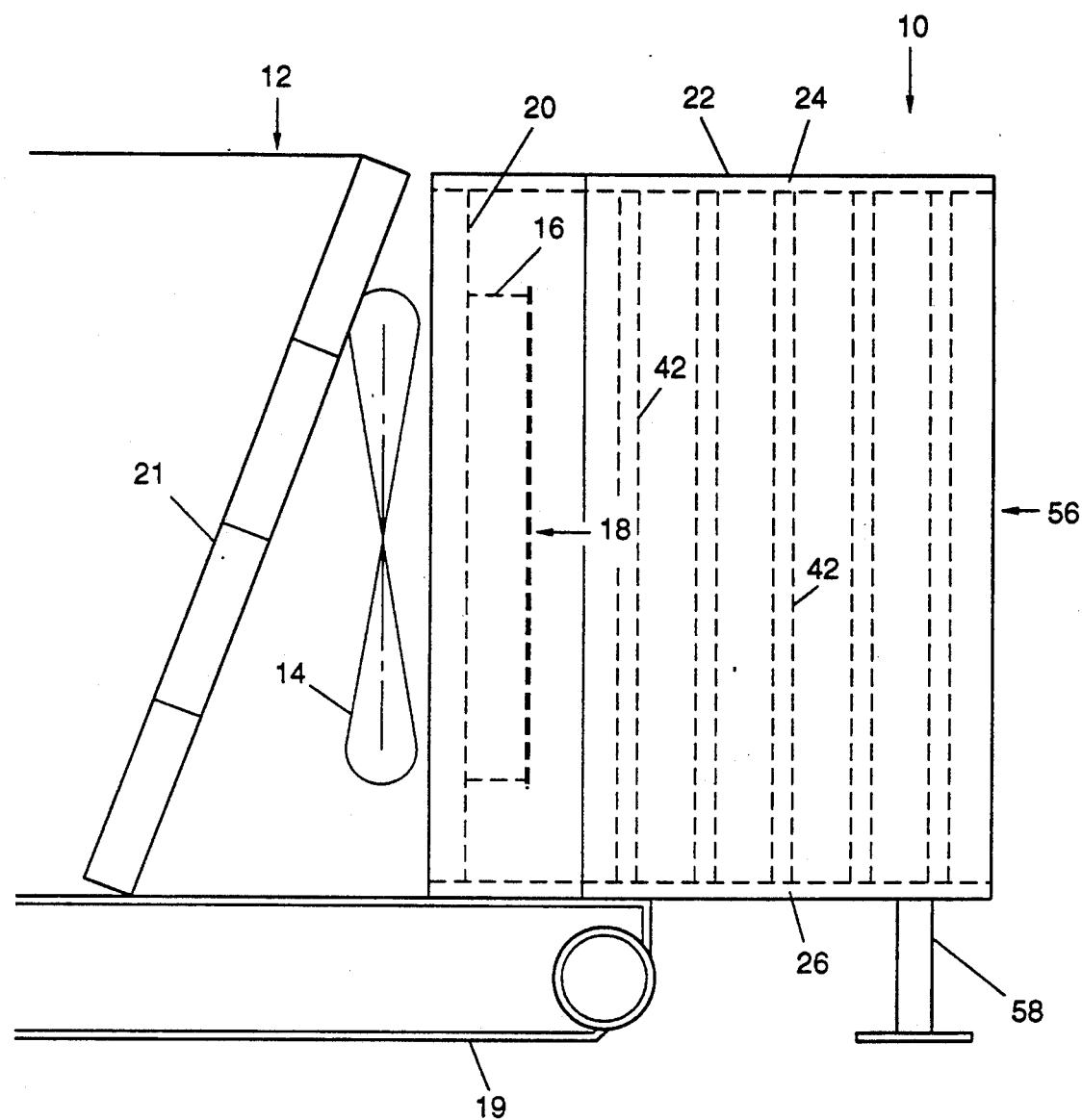
FIG. 4 is a side elevation view of the sound reduction unit of FIG. 2.

The illustration of FIG. 3 shows a preferred arrangement of the baffles that allows effective sound reduction while allowing free flow of air into the unit. As shown in FIG. 3, each of the baffles 50 is arranged in two facing chevron formations across the open front end 56 of the housing with the baffles at a 45° angle to the side walls 28. The central baffle 54 and baffles 52 extending outward at a 45° angle from the end of the baffle 54 are placed to block any direct passage of air from the air inlet to the outside between the two chevron formations.

For an exemplary sound reduction unit that is 120"×184½" in length (length of side wall 28) and width (distance between outside edges of opposite side walls 28) respectively, the baffles 50, 52 and 54 are 36" high and 3" in shortest dimension. For a given cooling fan inlet size, the open front 56 of the sound reduction unit must have a size that is sufficient, after considering the blockage of air by the baffles 42, 50, 52 and 54, to allow a sufficient volume of air to enter the fan inlet to prevent overheating of the fan or the gases compressed by the compressor. Thus, for a fan with an area of about 78 sq.ft., and the design shown in FIG. 3, it has been found that the open front area 56 should have an area of about 100 sq. ft.

The sound reduction unit 10 is preferably attached to the air cooling fan 12 along the bottom wall 26. The connection of the bottom wall 26 to the cooling fan 12 assists in preventing material on the ground in front of the cooling fan from being sucked into the cooling fan. By securing the sound reduction unit to the base 19 of the cooling fan 12 and to the upper part of the front face of the cooling fan, the unit may be cantilevered onto the cooling fan and need not have other support. The entire top wall 24 may be secured to the cooling fan if desired.

A person skilled in the art could make immaterial modifications to the invention described and claimed in this patent without departing from the essence of the invention.

The embodiments of the invention in which an exclusive property or privilege is claimed are defined as follows:

1. A sound reduction unit for a compressor, the compressor having a cooling fan, the cooling fan having a front face in which is disposed an air inlet, the sound reduction unit comprising:
   a sound absorbing housing attached to the cooling fan front face and surrounding the air inlet;
   the housing forming a passageway about the air inlet, the passageway being defined by a bottom wall, first and second side walls and a top wall and at least one of the walls being separated from the cooling fan front face to form an opening for the free flow of air into the air inlet;
   a plurality of sound absorbing baffles attached to the housing to block direct passage of sound from the air inlet while allowing free flow of air into the air inlet; and
   a flange baffle extending from at least the one of the side walls and the top wall to a point behind a lateral projection of the front face of the cooling fan.

2. The sound reduction unit of claim 1 in which the baffles are arranged in a chevron formation across the housing.

3. The sound reduction unit of claim 2 in which the baffles are arranged in a chevron formation across the front of the housing.

4. The sound reduction unit of claim 3 in which the housing is attached to the cooling fan.

5. The sound reduction unit of claim 4 in which the housing forms a passageway defined by bottom wall, first and second side walls and top wall and at least one of the walls is separated from the cooling fan to form an opening for the free flow of air.

* * * * *